Patented Apr. 22, 1947

2,419,283

UNITED STATES PATENT OFFICE 2,419,283

MANUFACTURE OF SULFENAMIDES

Philip T. Paul and Byron A. Hunter, Naugatuck, Conn., assignors to United States Rubber Company, New York, N. Y., a corporation of New Jersey No Drawing. Application January 27, 1944, Serial No. 519,946

4 Claims. (Cl. 260—306.6)

This invention relates to the manufacture of sulfenamides.

An object of the invention is to improve the yield of organic sulfenamides which are prepared by oxidative condensation of an organic mercaptan or disulfide of the aliphatic, alicyclic, aliphatic-aromatic, or heterocyclic series, with an amine. Other objects will be apparent from the following description.

It is postulated that the cross-oxidation reaction between a mercaptan and an amine proceed, as follows, using a primary amine for illustration:

(1) $2RSH + (O) \rightarrow RSSR + H_2O$
(2) $RSSR + 2RNH_2 \rightarrow RSNHR + RSH \cdot RNH_2$ According to this theory, the mercaptan, or its salt, which includes the mercaptides and dithiocarbamates, is first oxidized to the disulfide, which in turn reacts with the amine to form one molecule of sulfenamide and one molecule of the amine salt of the mercaptan.

It has now been found that if an alkali metal sulfate, e. g., sodium sulfate, is present during the oxidizing reaction that the final yield of sulfenamide is materially improved. Salts like sodium chloride, potassium chloride, or sodium phosphate do not produce the same result. Reaction 2 takes place most readily when the disulfide is reacted with undissolved amine, and apparently the alkali metal sulfate most favorably salts out the amine from the aqueous layer for optimum sulfenamide formation. However, whatever the mechanism of the reaction, the addition of the sulfate has a markedly favorable effect on the final yield of the sulfenamides, particularly those derived from organic mercaptans and disulfides, as first set forth above.

Among the useful oxidizing agents usable for the oxidative condensation of the mercaptans, and disulfides, are sodium hypochlorite, hydrogen peroxide, potassium persulfate, potassium ferricyanide, chlorine, bromine, iodine, potassium dichromate, etc.

The alkali metal sulfate is added as an additional chemical reagent to those other chemical reagents customarily employed for the oxidation reaction, and which, without the added alkali metal sulfate, provide comparatively lower yields of the sulfenamides. Examples of mercaptans and dithiocarbamates, and disulfides derived therefrom that may be used for the purposes of the present invention are: thiophenol, thio-B-naphthol, thiocresol, 2-mercaptobenzothiazole, 2-mercaptobenzoxazole, 2-mercaptobenzimidazole, 2-mercaptothiazole, 2-mercaptothiazoline, tetraethyl thiuram disulfide, tetramethyl thiuram disulfide, tetrapropyl thiuram disulfide, tetrabutyl thiuram disulfide, bis-(pentamethylene thiuram) disulfide, bis(oxydiethylene thiocarbamyl) disulfide, sodium dimethyl dithiocarbamate, dimethyl ammonium dimethyl dithiocarbamate, sodium diethyl dithiocarbamate, diethyl ammonium diethyl dithiocarbamate, sodium oxydiethylene dithiocarbamate, oxydiethylene ammonium oxydiethylene dithiocarbamate, bis(benzothiazyl) disulfide, bis-(benzoxazyl) disulfide, bis(benzimidazyl) disulfide, o-nitrophenyl disulfide, p-nitrophenyl disulfide, di-B-naphthyl disulfide, o-nitro thiophenol, p-nitro thiophenol, 4-methyl-2-mercapto benzothiazole, 4-phenyl-2-mercapto benzothiazole, 4-chloro-2-mercapto benzothiazole.

Exemplary of various usable amines are: isopropylamine, cyclohexylamine, diethylamine, diisopropylamine, dibutylamine, sec. butylamine, diamylamine, piperidine, morpholine.

The following examples are given to illustrate the invention, the parts being by weight:

*Example 1*

To 60 cc. of aqueous sodium benzothiazyl mercaptide solution (containing 0.2 mole of sodium benzothiazyl mercaptide) are added 40 cc. of water and 22 cc. (0.22 mole) of piperidine. Sodium sulfate (40 g.) is added and the mixture is well stirred as a freshly prepared 10% solution of sodium hypochlorite is added dropwise. The temperature of the reaction mixture is maintained near 20° C. The E. M. F. of the reacting mixture is held between 700 and 725 millivolts as determined by a potentiometer in conjunction with an antimony electrode and a saturated calomel half cell. Control of the E. M. F. is maintained by concurrent addition of 40% sulfuric acid. At the end of the reaction the potential drops below 690 millivolts and the addition of hypochlorite is stopped. The volume of hypochlorite added is 168 cc. (0.26 mole). The crystalline product is filtered from the reaction mixture, washed thoroughly with water, and dried in air. Pentamethylene benzothiazole sulfenamide is obtained in 92.5% yield. The product melts at 69–74° C.

When the sodium sulfate is omitted in an experiment similar to that above, the yield is 86%.

*Example 2*

A mixture of 37.4 g. (0.224 mole) of mercaptobenzothiazole, 45.2 cc. (0.448 mole) of diethylamine, 150 cc. of water, and 80 g. of sodium sulfate is well stirred as 162 cc. (0.25 mole) of 10% solution hypochlorite is added over a period of five hours. The temperature of the reaction mixture is kept at 35° C. throughout the addition. The product which separates as an oil is taken up in ether, washed thoroughly with water and dried over sodium sulfate. Evaporation of the solvent under diminished pressure leaves a residue of 48 g. (90.5% yield) of N,N-diethyl benzothiazole sulfenamide.

In a similar experiment in which the sodium sulfate is omitted from the reaction mixture, the yield of N,N-diethyl benzothiazole sulfenamide is 41 g. (77% of theory).

*Example 3*

To 60 cc. of aqueous sodium benzothiazyl mercaptide solution (containing 0.2 mole of sodium benzothiazyl mercaptide) are added 26.6 cc. (0.22 mole) of cyclohexylamine, 40.5 cc. of water and 40 g. of sodium sulfate. This mixture is well stirred at near 20° C. as freshly prepared 10% sodium hypochlorite solution is added dropwise. The E. M. F. of the reacting mixture is held at 690–700 millivolts as determined by a potentiometer in conjunction with an antimony electrode and a saturated calomel half cell. Control of the E. M. F. is maintained by concurrent addition of 40% $H_2SO_4$. The addition of hypochlorite is stopped when the E. M. F. falls below 680 millivolts. Substantially 0.3 mole of hypochlorite is used. The washed and dried product (N-cyclohexyl benzothiazole sulfenamide) weighs 49 g. (92.8% yield) and melts at 93–100° C.

In a similar experiment in which the sodium sulfate is omitted, the yield is 85.3% of N-cyclohexyl benzothiazole sulfenamide which melts at 93–100° C.

*Example 4*

A mixture of 63.6 cc. of sodium benzothiazyl mercaptide solution (containing 0.2 mole of sodium benzothiazyl mercaptide), 140 cc. of water, 29 cc. of cyclohexylamine (0.24 mole) and 80 g. of sodium sulfate is well stirred as a mixture consisting of 24 cc. of 30% $H_2O_2$ (0.22 mole), 80 cc. of 2.5 N sulfuric acid (0.2 mole) and 100 cc. of water is added dropwise over a period of one hour. The temperature of the reaction mixture is maintained near 50° C. The solid product is filtered, washed and dried. The yield of N-cyclohexyl benzothiazole sulfenamide is 93.5% of the theoretical.

When the above experiment is repeated, omitting the sodium sulfate, the yield is 79.5%.

*Example 5*

A mixture consisting of 300 cc. of sodium benzothiazyl mercaptide solution (1.0 mole), 100 cc. (1.18 moles) of isopropylamine, 200 cc. of water and 400 g. of sodium sulfate is very well stirred as a mixture of 150 cc. of 30% $H_2O_2$ (1.37 moles), 400 cc. of 2.5 N $H_2SO_4$ (1.0 mole) and 500 cc. water is added over a period of one hour. The reaction mixture is maintained at 50° C. throughout the addition. The crystalline product is filtered, washed well with water and dried. The yield of N-isopropyl benzothiazole sulfenamide melting at 91–93° C. is 184.5 g. (83% of theory).

In large runs it is advisable to whip the reaction mixture to a froth with a high speed mixer and to introduce the hydrogen peroxide into the vortex.

When the above experiment is repeated, omitting the sodium sulfate, the yield is only 60.3% of the theoretical.

*Example 6*

An aqueous solution is made up containing 0.15 mole of sodium benzothiazyl mercaptide in 75 cc. of solution. To this are added 19.2 cc. (0.225 mole) of isopropylamine and 75 cc. of water. Sodium sulfate (110 g.) is added and the mixture is stirred at 25° C. as a freshly prepared solution of sodium hypochlorite (1.57 molar) is dropped in. The potential of the reaction mixture is kept between 690 and 710 millivolts by addition of small amounts of 40% sulfuric acid as required. The potential is determined by means of a potentiometer in conjunction with an antimony electrode and a saturated calomel half cell. The end of the reaction is indicated by a noticeable drop in potential after 140 cc. (0.219 mole) of the hypochlorite has been added. The addition time is two hours. The yield of isopropyl benzothiazole sulfenamide is 65%.

When the above experiment is repeated, without the addition of sodium sulfate, the yield of product is 33.3%.

*Example 7*

To 150 cc. of an aqueous solution containing 0.15 mole of sodium benzothiazyl mercaptide are added 19.2 cc. (0.225 mole) of isopropylamine and 60 g. of anhydrous sodium sulfate. The mixture is stirred at 40° C. as a solid mixture of 44.6 g. (0.165 mole) of potassium persulfate and 8.74 g. (0.0825 mole) of sodium carbonate (anhydrous) is added over a period of 2 hours and 45 minutes. The yield of sulfenamide is 44.5%.

When the above experiment is repeated, without the addition of sodium sulfate, the yield is 40.8%.

*Example 8*

A suspension of 74 g. (0.25 mole) of tetraethyl thiuram disulfide and 80 g. of sodium sulfate in 110 g. (1.5 moles) of diethylamine and 30 cc. of water is stirred at 50–55° C. for six hours as a solution of 0.275 mole of sodium hypochlorite (containing 50% excess alkali) is dropped in during the same period. The reaction mixture after standing overnight is extracted with ether and the extracts thoroughly washed with water. Evaporation of the ether under diminished pressure leaves 72.5 g. of brown oil (66% yield).

In two similar experiments in which the sodium sulfate is omitted the yields are 48.2% and 47.7%.

*Example 9*

A solution is made up containing 40.5 g. (0.125 mole) of bis(oxydiethylene thiocarbamyl) disulfide, 150 cc. of water and 29.5 g. (0.5 mole) of isopropylamine. To this is added 80 g. of sodium sulfate. The mixture is stirred at 50° C. for five hours as a cold solution of 0.275 mole of sodium hypochlorite (containing 50% excess alkali) is added. The solid product is filtered off, washed and dried. The yield of N-isopropyl-S(oxydiethylene thiocarbamyl) hydrosulfamine is 32.7 g. (59.5%). The melting point is 83–83½.

In a similar experiment in which the sodium sulfate is omitted, the yield of the sulfamine is 21 g. (38.2%).

Having thus described our invention, what we claim and desire to protect by Letters Patent is:

1. In a process of forming a sulfenamide by oxidative condensation between an aliphatic amine containing at least one hydrogen attached to the amine nitrogen atom and a sulfur-containing organic compound selected from the group consisting of mercaptans, mercaptides, dithiocarbamates, and their disulfides, the step of adding to the aqueous solution containing the sulfur-containing organic compound, sodium sulfate, prior to adding the oxidizing agent.

2. In a process of making N-isopropyl benzothiazyl sulfenamide by oxidative condensation between isopropylamine and a water-soluble salt of mercapto benzothiazole, in aqueous solution, the step of adding to the aqueous solution containing said salt, sodium sulfate, prior to adding the oxidizing agent.

3. In a process of making N-isopropyl benzothiazyl sulfenamide by oxidative condensation between isopropylamine and a water-soluble salt of mercapto benzothiazole, in aqueous solution, the steps of adding sodium sulfate to the aqueous solution containing said water-soluble salt and said amine, prior to adding the oxidizing agent, and while stirring the mix adding the oxidizing agent, and carrying out the oxidative condensation to form the sulfenamide.

4. In a process of making N-isopropyl benzothiazyl sulfenamide by oxidative condensation between isopropylamine and a water-soluble salt of mercapto benzothiazole, in aqueous solution, the steps of adding sodium sulfate to the aqueous solution containing said water-soluble salt and said amine, prior to adding the oxidizing agent, and while stirring the mix adding the oxidizing agent, and carrying out the oxidative condensation to form the sulfenamide at a temperature between about 0° C. and about 55° C.

PHILIP T. PAUL.
BYRON A. HUNTER.

REFERENCES CITED

The following references are of record in the file of this patent:

UNITED STATES PATENTS

| Number | Name | Date |
|---|---|---|
| 2,191,657 | Harmon | Feb. 27, 1940 |
| 2,045,888 | Tschunker et al. | June 30, 1936 |
| 2,268,467 | Ashworth | Dec. 30, 1941 |
| 2,271,834 | Carr | Feb. 3, 1942 |
| 2,354,427 | Carr | July 25, 1944 |